(12) United States Patent
Kim et al.

(10) Patent No.: US 11,948,195 B2
(45) Date of Patent: **\*Apr. 2, 2024**

(54) EVALUATION EDUCATION DEVICE FOR DEBT MANAGEMENT CAPABILITY, AND METHOD THEREFOR

(71) Applicant: AJOU UNIVERSITY INDUSTRY-ACADEMIC COOPERATION FOUNDATION, Suwon-si (KR)

(72) Inventors: Do Yeong Kim, Suwon-si (KR); Do Won Kim, Gangneung-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/958,522

(22) PCT Filed: Jul. 11, 2018

(86) PCT No.: PCT/KR2018/007861
§ 371 (c)(1),
(2) Date: Jun. 26, 2020

(87) PCT Pub. No.: WO2019/132145
PCT Pub. Date: Jul. 4, 2019

(65) Prior Publication Data
US 2021/0019831 A1  Jan. 21, 2021

(30) Foreign Application Priority Data
Dec. 28, 2017 (KR) .................. 10-2017-0182003

(51) Int. Cl.
*G06Q 40/06* (2012.01)
*G06Q 40/02* (2023.01)
*G06Q 50/20* (2012.01)

(52) U.S. Cl.
CPC ............. *G06Q 40/06* (2013.01); *G06Q 40/02* (2013.01); *G06Q 50/205* (2013.01)

(58) Field of Classification Search
None
See application file for complete search history.

(56) References Cited

U.S. PATENT DOCUMENTS 8,595,105 B2 *  11/2013  Hirsch ............... G06Q 10/0637
                                                       700/91
2002/0123949 A1 *  9/2002  VanLeeuwen ......... G06Q 40/00
                                                       705/35
2006/0004654 A1   1/2006  Kornegay et al.
(Continued)

FOREIGN PATENT DOCUMENTS

JP    2013-205672 A      10/2013
JP    2013205672 A   *  10/2013
(Continued)

OTHER PUBLICATIONS

"Night of the Living Debt", Northwest Youth Financial Education, University of Idaho. Aug. 11, 2016. (Year: 2016).*
(Continued)

*Primary Examiner* — Paul S Schwarzenberg
(74) *Attorney, Agent, or Firm* — Sughrue Mion, PLLC

(57) ABSTRACT

The present embodiment provides an assessment education device and method for a debt management capability, the device and method generate an event that causes psychological confusion in rounds on a debt management assessment scenario and provide education contents when a user who is in a psychologically confused state repays the debt, such that individuals attempting to repay the debt can be induced to make rational decisions in a situation in which (Continued)

various debts are nixed and the debt management capability of individuals can be improved.

7 Claims, 17 Drawing Sheets

(56) References Cited

U.S. PATENT DOCUMENTS

| | | | |
|---|---|---|---|
| 2007/0288357 A1 | 12/2007 | Holman et al. | |
| 2010/0248192 A1* | 9/2010 | Thompson | G09B 19/18 434/107 |
| 2013/0339219 A1* | 12/2013 | Bernheimer | G06Q 40/02 705/38 |
| 2017/0103678 A1* | 4/2017 | Gingher | G06F 7/588 |

FOREIGN PATENT DOCUMENTS

| | | |
|---|---|---|
| KR | 10-2005-0107144 A | 11/2005 |
| KR | 2007-4989 A | 1/2007 |
| KR | 10-2013-0100614 A | 9/2013 |
| KR | 10-1772803 B1 | 8/2017 |

OTHER PUBLICATIONS

Alhadeff, "Serious Games Help Students Build A Positive Credit History", serious game market.com, Jul. 21, 2016. (Year: 2016).*

Extended European Search Report dated Aug. 6, 2021 in Application No. 18895071.1.

"Introduction & Manual for Night of the Living Dept", 2016, 9 pgs., <URL: http://www.uidaho.edu/extension/4h/programs/nw-youth-financial-ed/programs/living-debt,http://www.uidaho.edu/-/media/Uldaho-Responsive/Files/Extension/nw-youth-financial-ed/START-HERE-NLD-Instructors-Giude.ashx>.

Serious Game Market, "Serious Games Help Students Build A Positive Credit History" Jul. 1, 2016, 9 pgs., <URL: http://www.seriousgarmemarket.com/2016/07/serious-games-help-students-build.html>.

International Search Report for PCT/KR2018/007861 dated, Oct. 12, 2018 (PCT/ISA/210).

* cited by examiner

[Fig. 1]
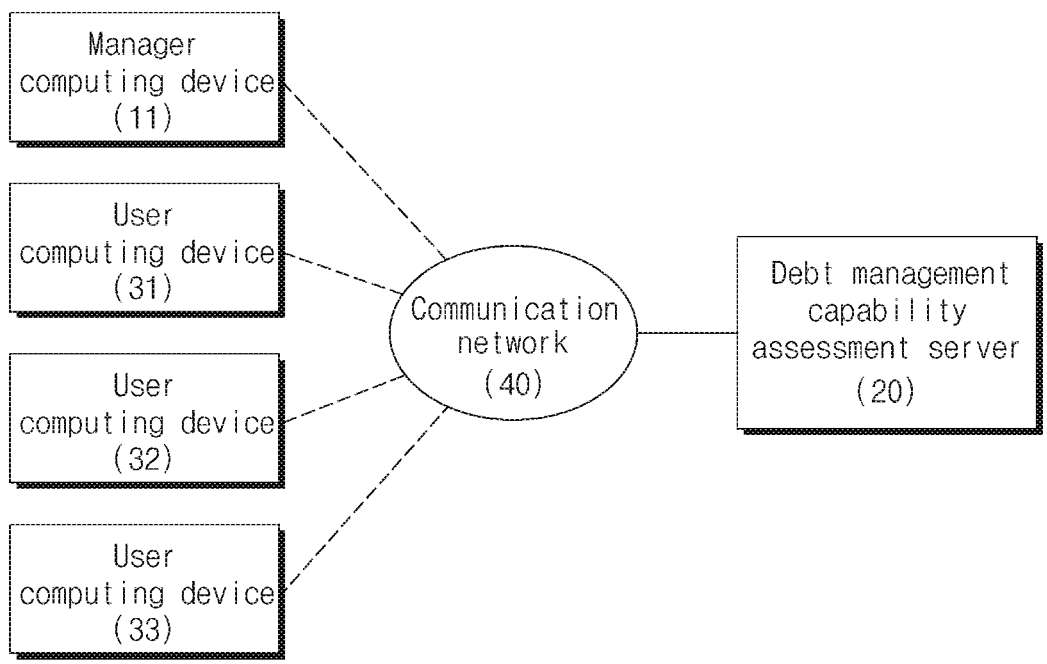

[Fig. 2]
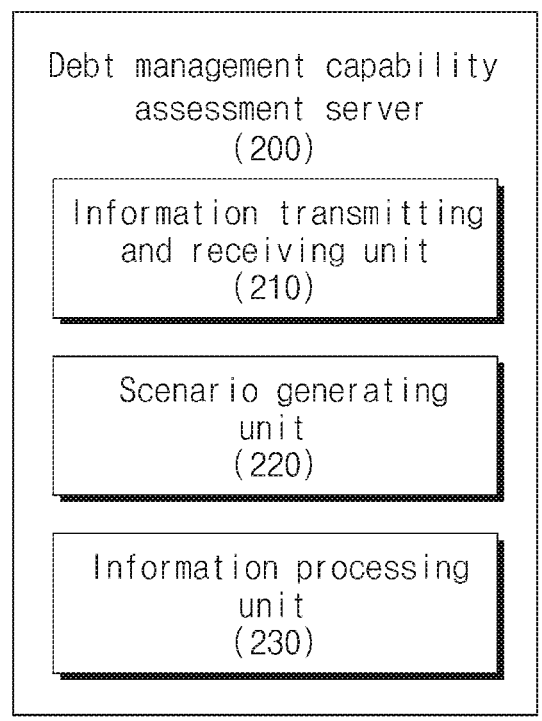

[Fig. 3]
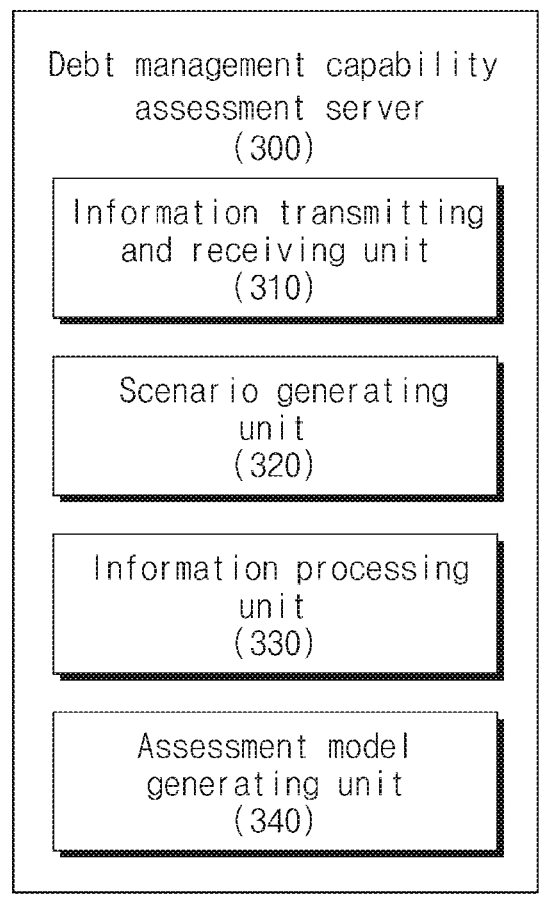

[Fig. 4]

| | | |
|---|---|---|
| Activation | ■ | |
| Scenario title | | |
| Debt display option | ☐ | Normal |
| | ■ | Prospective |
| | ☐ | Retrospective |
| | ☐ | Retroprospective |
| Maximum rounds | 25 | |
| Bonus round | 6,12,19 | |
| Bonus amount | 2000, 15000, 40000 | |
| Saving mode | ☐ | |
| Elapsed time | ☐ | |

[Fig. 5]

| Debt name | Initial debt amount | Interest rate |
|:---:|:---:|:---:|
| A | 3000.00 | 2.50 |
| B | 8000.00 | 2.00 |
| C | 11000.00 | 3.50 |
| D | 13000.00 | 3.25 |
| E | 52000.00 | 3.75 |
| F | 60000.00 | 4.00 |

| | |
|:---|:---:|
| Initial asset | 5000 |
| Fixed income | 5000 |
| Currency symbol | $ ☐ Front ■ Back |
| Pre-questionnaire URL | |
| Post-questionnaire URL | |

[Fig. 6]

Psychological mechanism occurrence event for every round

| Round | FOP (Tendency of optimizing debt management) | DAA (Tendency of avoiding debt management) | Timing when psychological mechanism occurs (education intervention is required) |
|---|---|---|---|
| 1 | Start to repay F having largest interest rate and amount | Start to repay parts of debts A and B having smallest amount | Determine first which debt needs to be repaid (psychological mechanism works) |
| 2 | | | |
| 3 | During repayment of F having largest interest rate and amount, balance of F becomes smaller than E having second largest amount | Finish repayment of B and start to repay debt C having third largest amount | Even though account having higher interest rate needs to be continuously repaid, if a debt amount is focused due to a psychological reason, an account having a higher debt amount is focused regardless of the interest rate(psychological mechanism works) |
| 5 | | Finish repayment of C and start to repay debt D having next largest amount | |
| 6 | | Finish repayment of D and start to repay debt E having smaller amount | Bonus amount $20000 is paid (start saving) (psychological mechanism works) |
| 11 | Finish Repayment of F and then start to repay debt E having second largest interest rate | | |
| 12 | | | Bonus amount $15000 is paid (start saving) (psychological mechanism works) |
| 16 | | Finish repayment of E and start to repay last debt F | |
| 19 | | | Bonus amount $40000 is paid (psychological mechanism works) |
| 22 | Finish repayment of E and then start to repay debt C having next largest interest rate | | |

[Fig. 7]

| Debt Training Strategy (DTS) | Definition | Statement |
|---|---|---|
| DTS 1 | Selection of account with highest interest rate first | Account having highest interest rate needs to be selected (start) first (DAA) |
| DTS 2 | Payoff the debt with account in the order of higher interest rate | All cash needs to be deposited in account having highest interest rates in turn to reduce debt |
| DTS 3 | Consistently following DTS2 | Even though size of debt is reduced, debt having higher interest rate needs to be preferentially repaid (consistency) |
| DTS 4 | Consistently following DTS 2 even with any extra cash or income available | Even though cash is increased due to bonus or extra incomes, all amounts need to be used to repay debt having high interest rate (psychologically, cash is saved. Actually, cash is spent) |

[Fig. 8]

Quiz about debt management education

| Debt account | Debt amount | Annual interest rate |
|---|---|---|
| A | 55.6 million won | 2% |
| B | 69.5 million won | 3.75% |
| C | 54.75 million won | 2.5% |
| D | 34 million won | 4% |
| E | 57.22 million won | 3.25% |
| F | 40.85 million won | 3.5% |

You have debt as represented in table. You currently have 50 million won available. In order to most efficiently repay debt among six debt accounts, which one needs to be repaid?

① Repay debt account A
② Repay debt account B
③ Repay debt account C
④ Repay debt account D first and the repay E
⑤ Repay debt account D first and the repay F
⑥ Repay debt account D first and the repay B Feedback: debt having highest interest rate needs to be repaid so that debt account D need to be repaid first and then remaining money needs to be used to repay debt account B having second highest interest rate

[Fig. 9]
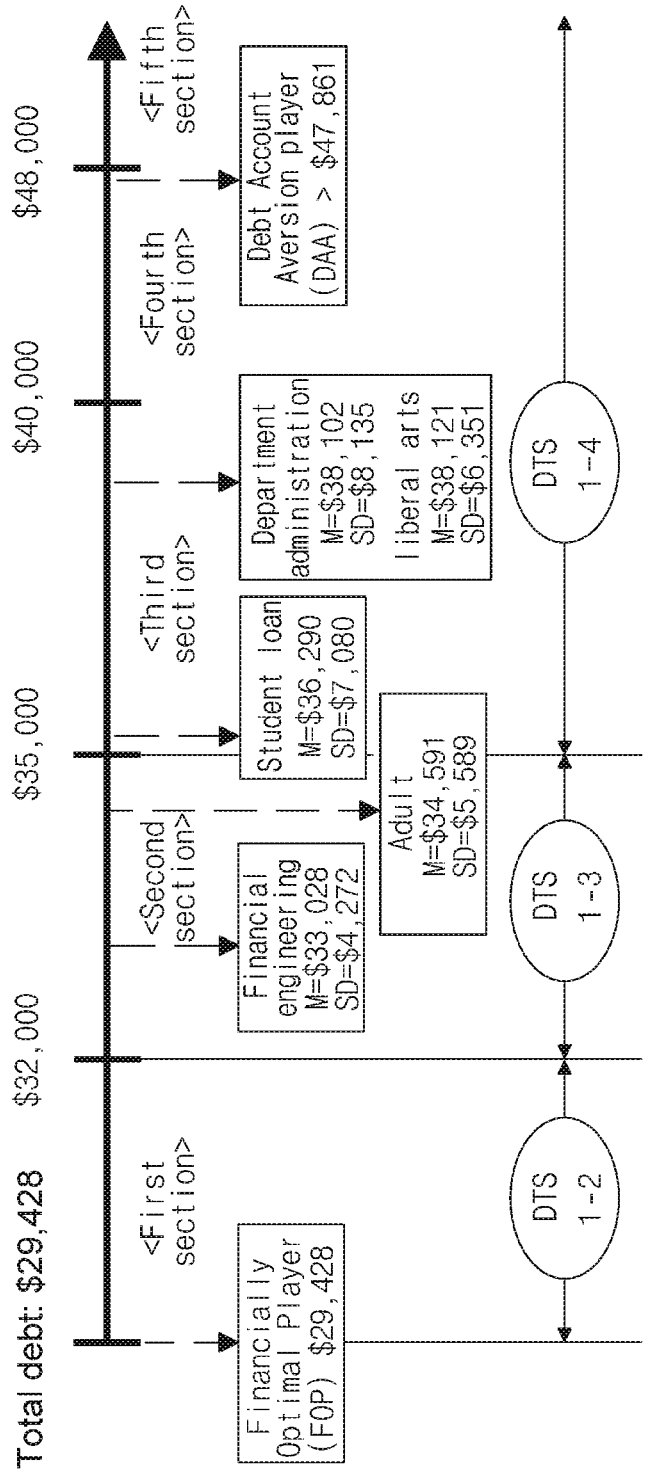

[Fig. 10]
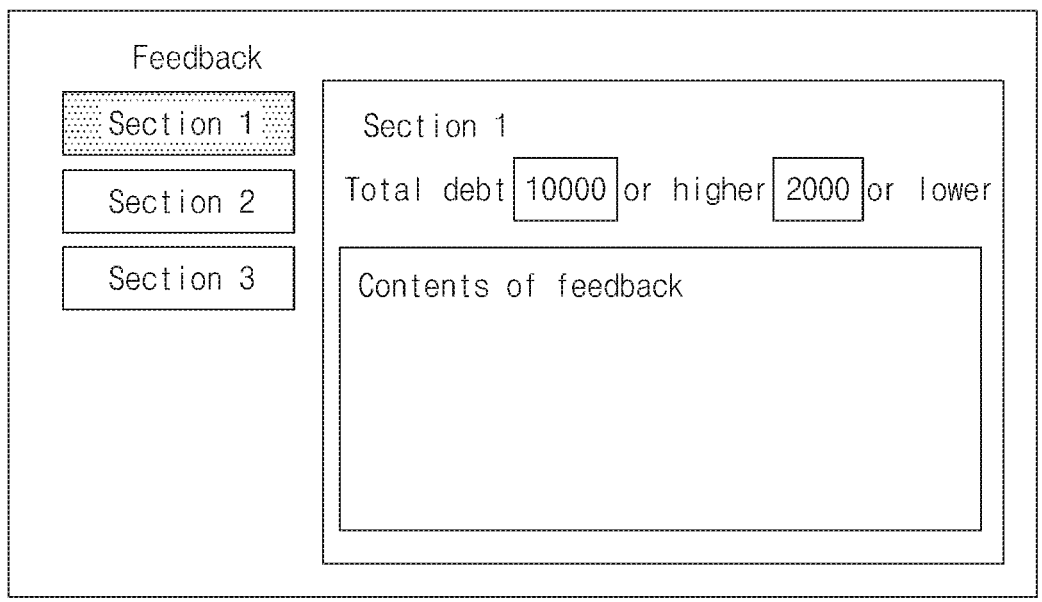

[Fig. 11]

| Annual income | |
|---|---|
| Fixed income | 5000.00 |
| Bonus | 0.00 |
| Progress | |
| Current round | 10 |
| Available cash | 5000.00 |
| Total debt amount | 147000.00 |
| Repayment plan | |
| Debt name | Repayment amount |
| A | |
| B | |
| C | |
| D | |
| E | |
| F | |
| Reset | Approve |

[Fig. 12]

| Debt information of current round | | | |
|---|---|---|---|
| Debt name | Current balance | Interest rate | Maximum increased interest (for one year) |
| A | 3000.00 | 2.50 | 75.00 |
| B | 8000.00 | 2.00 | 160.00 |
| C | 11000.00 | 3.50 | 385.00 |
| D | 13000.00 | 3.25 | 422.50 |
| E | 52000.00 | 3.75 | 422.50 |
| F | 60000.00 | 4.00 | 2400.00 |

[Fig. 13]

| Debt information of final round | | |
|---|---|---|
| Debt name | Final balance | Interest rate |
| A | 5561.89 | 2.50 |
| B | 13124.86 | 2.00 |
| C | 4538.89 | 3.50 |
| D | 1113.98 | 3.25 |
| E | 10014.02 | 3.75 |
| F | completed | 4.00 |

[Fig. 14]
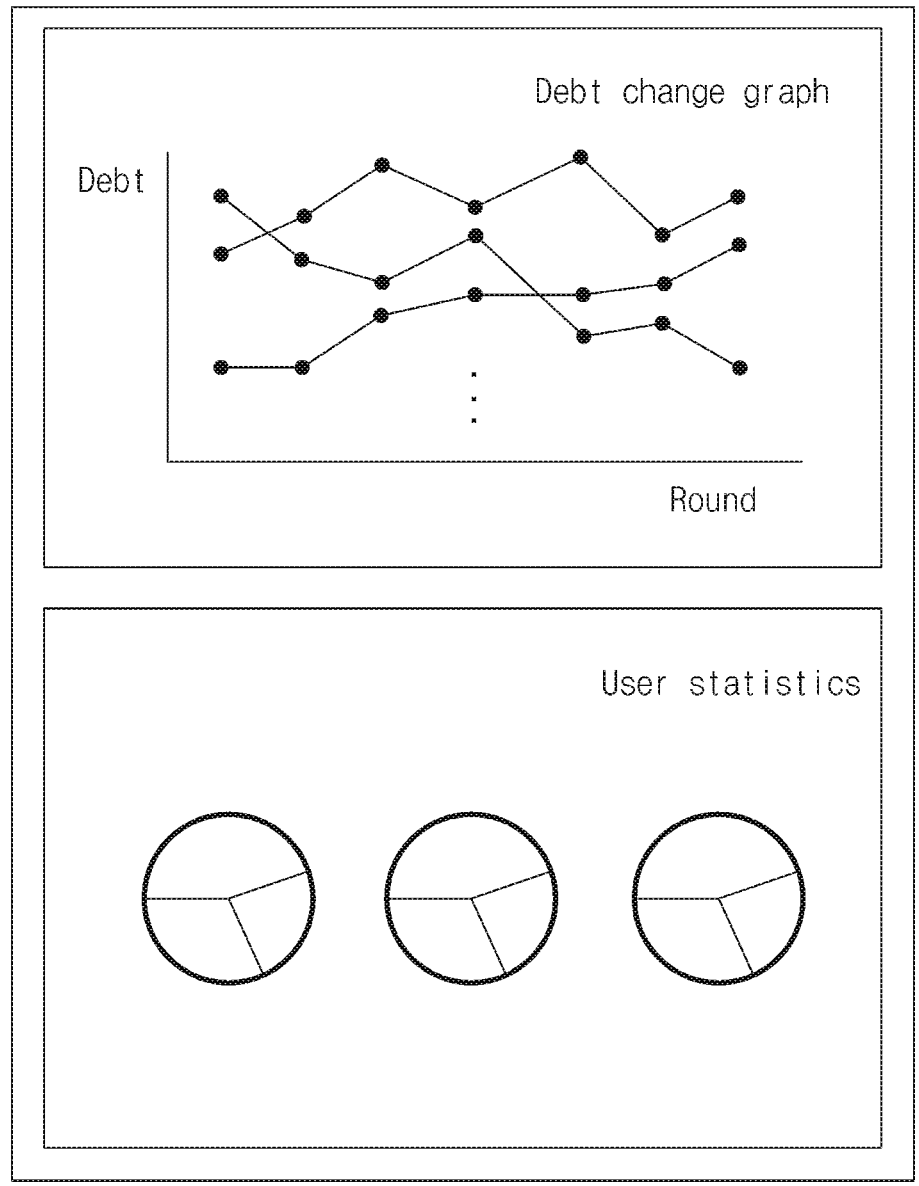

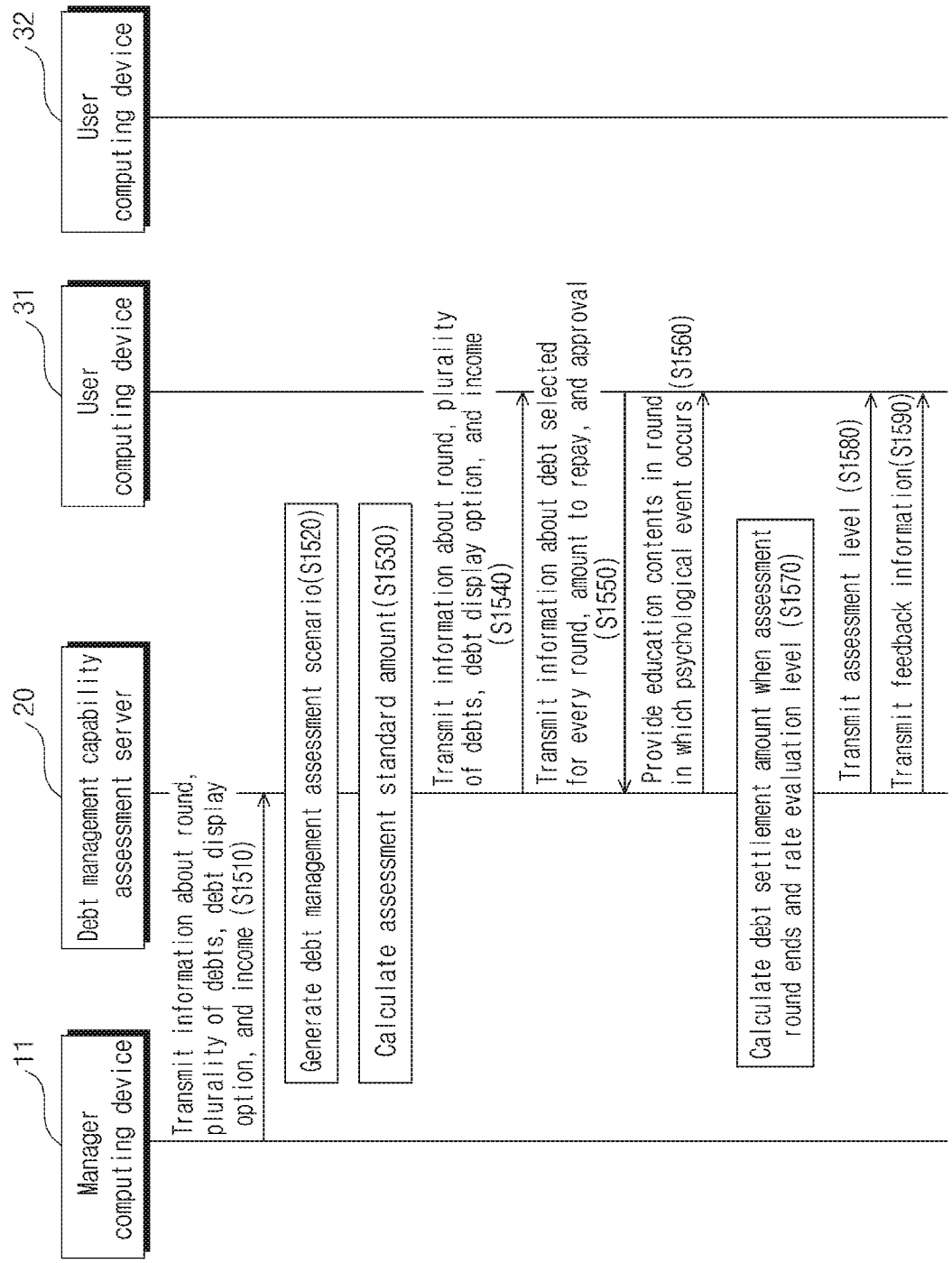

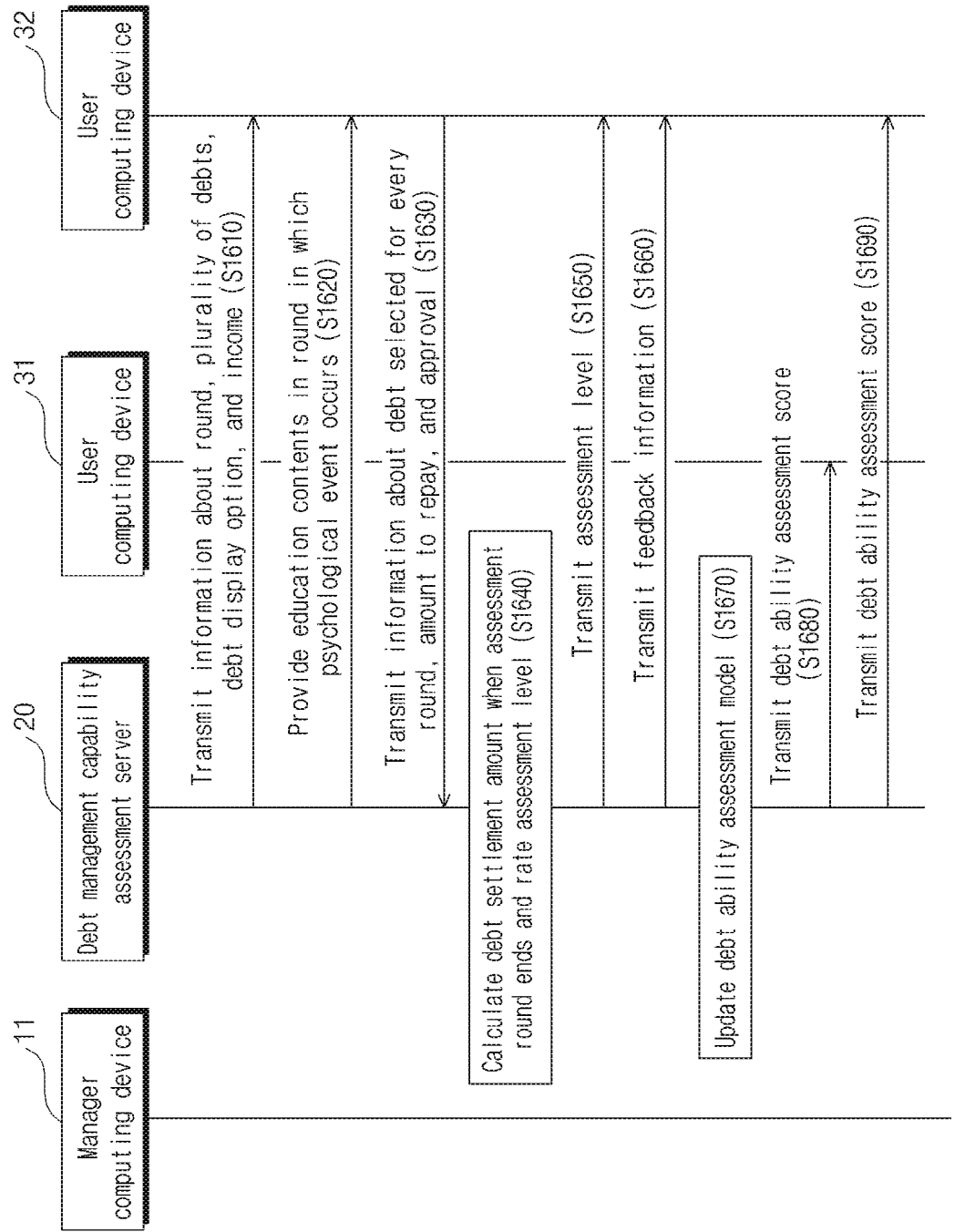
[Fig. 16]

[Fig. 17]
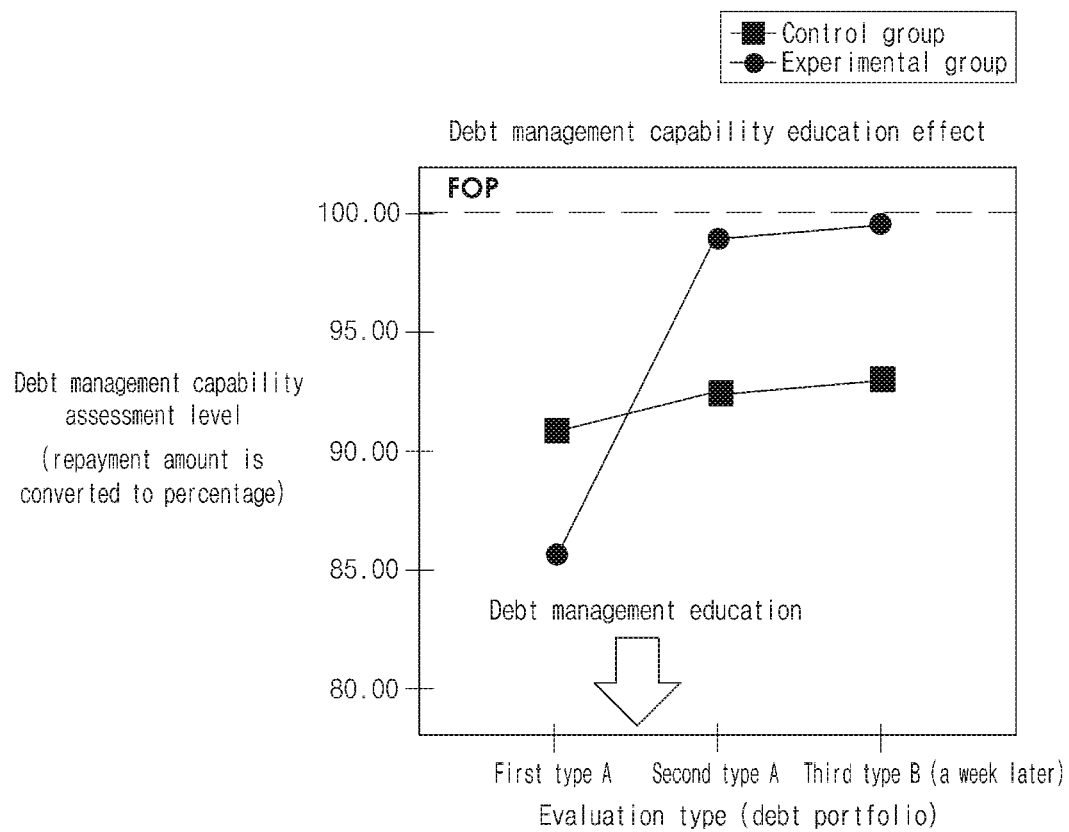

EVALUATION EDUCATION DEVICE FOR DEBT MANAGEMENT CAPABILITY, AND METHOD THEREFOR

CROSS-REFERENCE TO RELATED APPLICATIONS

This application claims priority under 35 U.S.C. § 119(a) to a Korean Patent Application No. 10-2017-0182003 filed in the Korean intellectual Property Office on Dec. 28, 2017, the entire contents of which are incorporated herein by reference.

TECHNICAL FIELD

A technical field of the present invention relates to an apparatus and a method of assessing and educating a personal debt management capability. This research is related to a basic research project (No. 2017R1E1A2A02022040) in science and engineering conducted with the support of the National Research Foundation of Korea on 2017. This research is related to the science and technology internationalization project (No. 2017K1A3A7A08087767) conducted with the support of the National Research Foundation of Korea on 2017.

BACKGROUND ART

The contents described in this section merely provide background information on the present exemplary embodiment but do not constitute the related art.

Household debt becomes a serious social and economic problem. Individuals cannot use their income only to repay debts. Spending exists to maintain a person's life, which is defined as consumption in Economics. That is, an amount of debt which can be paid in reality may vary depending on the situation of the individuals.

Behavioral studies said that when there is a plurality of debts, people irrationally repay the debt. For example, people tend to repay a smaller debt among the plurality of debts with different interest rates and amounts to reduce the psychological burden (debt account aversion: DAA).

In order to solve these psychological mechanisms, it is necessary to evaluate a personal or household debt management capability and strengthen the debt management capability. However, there is no objective data and standard to determine it. In addition, there is no platform for educating individuals about debt repayment strategies required for the debt repayment.

SUMMARY OF THE INVENTION

The inventor of the present invention proposes an Internet based debt management capability assessment and education ICT platform which checks a personal debt management capability and provides education contents therefor.

A major object of the exemplary embodiments of the present invention is to generate an event that causes various types of psychological confusion occurring during the debt management and debt repayment processes in rounds on a debt management assessment scenario and provides education contents when a user in a psychologically confused state repays the debt to induce the individuals to make rational decisions in a situation in which various debts are mixed and improve the debt management capability of the individuals.

Other and further objects of the present disclosure which are not specifically described can be further considered within the scope easily deduced from the following detailed description and the effect.

According to an aspect of the present embodiment, a debt management capability assessment method by a debt management capability assessment server includes generating a debt assessment scenario set by a plurality of rounds; receiving debt repayment information for every round from a computing device of a user who participates in the debt assessment scenario; transmitting education contents to the computing device of the user based on a debt training strategy in a round where a psychological event occurs, among the plurality of rounds; and calculating a debt settlement amount for the plurality of debts based on the debt repayment information received from the computing device of the user until a predetermined assessment round when the predetermined assessment round among the plurality of rounds ends, rating an assessment level for the user based on the debt settlement amount, and transmitting the assessment level to the computing device of the user.

According to another aspect of the present embodiment, a scenario generating unit which generates a debt assessment scenario set by a plurality of rounds; an information transmitting and receiving unit which receives debt repayment information for every round from a computing device of a user who participates in the debt assessment scenario; and an information processing unit which generates education contents based on a debt training strategy in a round in which a psychological event occurs, among the plurality of rounds, in which the information processing unit calculates a debt settlement amount for the plurality of debts based on the debt repayment information received from the computing device of the user until a predetermined assessment round when the predetermined assessment round among the plurality of rounds ends, rates an assessment level for the user based on the debt settlement amount, and transmits the assessment level to the computing device of the user.

According to still another aspect of the present embodiment, in the debt management capability education process, during the process of assessing the debt in accordance with a debt assessment level of the user, the information transmitting and receiving unit transmits the education contents to the user computing device in a round in which the psychological event occurs.

According to still another aspect of the present embodiment, a debt management capability assessment method by a computing device includes: participating in a debt management assessment scenario generated by the debt management capability assessment server, receiving information about the round, information about a plurality of debts, display option information about a plurality of debts to be displayed for every round, and information about the income from the debt management capability assessment server; transmitting (i) at least one debt selected from the plurality of debts, (ii) an amount of income to repay the selected at least one debt, and (iii) approval information which advances from the current round to a next round, for every round, to the debt management capability assessment server, receiving education contents generated based on a debt training strategy in the round in which the psychological event occurs; and receiving a calculated assessment level from the debt management capability assessment server when a predetermined assessment round ends.

As described above, according to the exemplary embodiments of the present invention, debt repayment information is received for every round from a computing device of a user who participates in a debt assessment scenario and education contents are created based on a debt training strategy in a round when a psychological event occurs, among the plurality of rounds, to transmit the education contents to the computing device of the user. Accordingly, an individual who wants to repay the debt is induced to make rational decisions in a situation in which various debts are mixed and a debt management capability of the individuals is improved.

According to the exemplary embodiments of the present invention, in view of the individual, the user experiences a debt repayment process through online so that the user may learn a personal debt management skill and receive feedback from the present online system itself as well as experts. Further, in view of the corporate, a potential defaulter(s) or a person who lacks debt management capability is predicted and screened to improve the financial solvency.

BRIEF DESCRIPTION OF THE DRAWINGS

FIG. 1 is a view illustrating a debt management capability assessing system according to exemplary embodiments of the present invention.

FIGS. 2 and 3 are block diagrams illustrating a debt management capability assessment server according to exemplary embodiments of the present invention.

FIGS. 4 and 5 illustrate information processed by a debt management capability assessment server according to exemplary embodiments of the present invention.

FIG. 6 illustrates a psychological event for every round processed by a debt management capability assessment server according to exemplary embodiments of the present invention.

FIG. 7 illustrates a debt training strategy processed by a debt management capability assessment server according to exemplary embodiments of the present invention.

FIG. 8 illustrates a quiz about a debt management education processed by a debt management capability assessment server according to exemplary embodiments of the present invention.

FIG. 9 illustrates an assessment grade processed by a debt management capability assessment server according to exemplary embodiments of the present invention.

FIG. 10 illustrates feedback information processed by a debt management capability assessment server according to exemplary embodiments of the present invention.

FIGS. 11 to 14 are views illustrating a screen of a computing device of a user according to another exemplary embodiment of the present invention.

FIGS. 15 and 16 are flow charts illustrating a debt management capability assessment method according to exemplary embodiments of the present invention.

FIG. 17 illustrates a result of a simulation performed according to exemplary embodiments of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

FIG. 1 is a view illustrating a debt management capability assessing system according to exemplary embodiments of the present invention. Referring to FIG. 1, a debt management capability assessment system includes at least one manager computing device 11, a plurality of user computing devices 31, 32, and 33, a debt management capability assessment server 20, and a communication network 40.

The computing devices 11, 31, 32, and 33 of the manager or the user are electronic devices which transmit data required to be processed by the debt management capability assessment server 20 and receive processed data. The computing devices 11, 31, 32, and 33 may include a smart phone, a personal computer (PC), a tablet PC, a personal digital assistant (PDA), or a laptop computer.

The computing devices 11, 31, 32, and 33 of the manager or the user and the debt management capability assessment server 20 are connected via the communication network 40. The communication network 40 refers to a set of communication facilities which are connected to enable the communication between the computing devices 11, 31, 32, and 33 of the manager or the user and the debt management capability assessment server 20. The communication network 40 includes a node, a line, a trunk line, and a satellite, which are connected to each other.

The computing devices 11, 31, 32, and 33 of the manager or the user may perform wired or wireless communication. For example, for the wireless communication, various communication protocols such as short distance wireless communication, long distance wireless communication, mobile communication, and wireless LAN communication may be used. The wireless communication protocols may include near field communication (NFC), ZigBee, Bluetooth, Wi-Fi, WiMAX, global system for mobile communication (GSM), 3G (third generation) mobile communication, and long term evolution (LTE), but is not limited thereto.

The debt management capability assessment server 20 includes database. The database refers to a data storage form which freely searches, extracts, deletes, edits, and add data. The database may be implemented to be suitable for the object of the present exemplary embodiment using Oracle, Infomix, Sybase, relational database management system (RDBMS), Gemston, Orion, and object oriented database management system (OODBMS).

FIGS. 2 and 3 are block diagrams illustrating a debt management capability assessment server according to exemplary embodiments of the present invention. As illustrated in FIG. 2, the debt management capability assessment server 200 includes an information transmitting and receiving unit 210, a scenario generating unit 220, and an information processing unit 230. The debt management capability assessment server 200 may omit some components among various components which are exemplarily illustrated in FIG. 2 or may additionally include other component. Referring to FIG. 3, the debt management capability assessment server 300 may further include an assessment model generating unit 340.

The debt management capability assessment server 200 proceeds a set number of rounds, selects a specific debt from a plurality of debts for each round, determines an amount to repay the debt from income, rates an assessment level for a user according to an amount of debt calculated in the final round, and provides feedback information to the user according to the assessment level. Information about the feedback for every section is illustrated in FIG. 6.

The debt management capability assessment server 200 generates a debt management assessment scenario. The debt management assessment scenario is generated based on a constraint set by the computing device 11 of the manager and is a kind of a simulation in which computing devices 31, 32, and 33 of the user may participate.

The information transmitting and receiving units 210 and 310 receive information about the round, information about a plurality of debts, display option information about a plurality of debts to be displayed for every round, and information about the income from the manager computing device 11.

The information transmitting and receiving units 210 and 310 receive information about the debt and information about the income input in accordance with a personal financial situation by the user from the user computing devices 31, 32, and 33. The user computing devices 31, 32, and 33 receives information about the plurality of debt accounts possessed by the individual who has a debt and income from the user. For example, information about the plurality of debt accounts includes a number of debt accounts, a total debt, an interest rate of each account, and a repayment period (in months or years). Personal income includes a fixed income, a liquid income, available assets, bonuses, and other incomes.

The information transmitting and receiving units 210 and 310 transmit information about the round, information about the plurality of debts, the display option information, and the information about the income to a computing device 31 of at least one user among a plurality of users which participates in the debt management assessment scenario.

The information transmitting and receiving units 210 and 310 receive (i) at least one debt selected from the plurality of debts, (ii) an amount of income to repay the selected at least one debt, and (iii) approval information which advances from the current round to a next round, for every round, from the at least one user computing device 31. With regard to this, in FIG. 11, a screen of the user computing device 31 is illustrated.

The information transmitting and receiving units 210 and 310 transmit an assessment level rated by the information processing units 230 and 330 to the at least one user computing device 31. The information transmitting and receiving units 210 and 310 transmits feedback information defined in advance in accordance with the assessment level to the at least one user computing device 31. The feedback information is updated by the information processing units 230 and 330 and the information transmitting and receiving units 210 and 310 transmit the updated feedback information to the user computing device 31.

A debt settlement amount of the final round may vary depending on a debt training strategy of the user. That is, the debt settlement amount has a value in the range of a maximum amount and a minimum amount depending on the debt management capability. The debt management capability assessment server 200 provides feedback information including the repayment strategy based on a debt management capability of the individual. For example, the repayment strategy is classified into a no strategy step, a high interest rate selecting step, an all-in payment step, and a completed strategy step. In the no strategy step, a strategy is not used and the largest debt settlement amount is shown. In the highest interest rate selecting step, a debt having a highest interest rate is selected and the debt settlement amount is smaller than that in the no strategy step. In the all-in repayment step, all available cash is concentrated to repay the debt and the debt settlement amount is smaller than that in the larger interest rate selecting step. In the completed strategy step, an existing strategy is maintained regardless of the external situation and the debt settlement amount is smaller than that in the all-in repayment step.

The scenario generating units 220 and 320 generate a debt management assessment scenario based on the information about the round, the information about the plurality of debts, the display option information, and the information about the income.

The scenario generating units 220 and 320 may generate a personally customized debt assessment scenario. The scenario generating units 220 and 320 generate the personally customized debt assessment scenario based on information about an actual debt in accordance with a personal financial situation and information about an actual income, received from the user computing device. According to the present exemplary embodiment, a personally customized debt management capability assessment and education method is provided to improve a debt management capability suitable for a personal financial situation and provide a practical financial management advice specialized for the individual.

The information processing units 230 and 330 calculate an assessment standard amount for a total amount of the plurality of debts from a first round to a predetermined assessment round for the debt management assessment scenario, based on the information about the round and the information about the plurality of debts. The predetermined assessment round may correspond to the final round among the rounds. A total amount for the plurality of debts may be evaluated by prematurely calculating the debt in an arbitrary round. The assessment standard amount is an amount obtained by minimizing a total amount for the plurality of debts mathematically calculated by reflecting an interest rate corresponding to a principal amount of each of the plurality of debts as the round proceeds. That is, the assessment standard amount represents a minimum debt amount repayable in the condition for a limited round, a debt, and an income. An assessment standard amount calculating formula may be expressed by a relation between the number of rounds and the principal and interest. The information processing units 230 may calculate the assessment standard amount in a round regarding an actual debt repayment period based on information about a debt and an income input to be suitable for the personal financial situation.

The information processing units 230 and 330 generate education contents based on the debt training strategy in a round where a psychological event occurs, among the plurality of rounds. The information transmitting and receiving units 210 and 310 transmit the education contents to the user computing device in the round where the psychological event occurs. With regard to this, in FIGS. 6 to 9, education contents in accordance with a psychological event for every round, a debt training strategy, a quiz, and an assessment level are illustrated.

When the predetermined assessment round ends, the information processing units 230 and 330 calculate a debt settlement amount based on (i) at least one debt selected from the plurality of debts and (ii) an amount to repay the selected at least one debt which have been received until the assessment round. The information processing units 230 and 330 rate the assessment level for the user based a difference between the debt settlement amount and the assessment standard amount. The assessment level is sent in consideration of a mistake (for example, unintended savings) which occurs in the middle of the scenario, a debt repayment order, a difference between interest rates, a difference between the debt amounts, and a debt display option (hint). A weight may be applied to the above-described elements.

The information processing units 230 and 330 update the feedback information in association with questionnaire information regarding a mathematical knowledge and financial knowledge and the debt settlement amount received from at least one computing device 31. The questionnaire information may include information about an actual asset, an actual debt, and an actual income of at least one user. The questionnaire information may be input before generating the scenario, before starting the round, or after finishing the final round.

The information processing units 230 and 330 may calculate a weight and a repayment strategy for the actual debt based on the information about an actual asset, an actual debt, and an actual income of at least one user to update the feedback information. Here, the repayment strategy is classified into a no strategy step, a high interest rate selecting step, an all-in payment step, and a completed strategy step.

The assessment model generating unit 340 generates a debt capability assessment model by means of statistical analysis together with profile information of the plurality of users. The debt ability assessment model is generated based on (i) at least one debt selected from the plurality of debts, (ii) an amount of income to repay the selected at least one debt, and (iii) approval information which advances from the current round to a next round, which are received for every round, from the plurality of user computing devices 31. The debt ability assessment model is trained in consideration of a mistake (for example, unintended savings) which occurs in the middle of the scenario, a debt repayment order, a difference between interest rates, a difference between the debt amount, and a debt display option (hint).

Even though components included in a debt management capability assessment server are separately illustrated in FIGS. 1 and 2, the plurality of components is coupled to each other to be implemented by at least one module. The components are connected to a communication path which connects a software module or a hardware module in the apparatus to organically operate between the components. The components communicate with each other using one or more communication buses or signal lines.

The debt management capability assessment server may be implemented in a logic circuit by hardware, firm ware, software, or a combination thereof or may be implemented using a general purpose or special purpose computer. The device may be implemented using hardwired device, field programmable gate array (FPGA) or application specific integrated circuit (AMC). Further, the device may be implemented by a system on chip (SoC) including one or more processors and a controller.

The debt management capability management server may be mounted in a computing device or server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

FIGS. 4 to 10 illustrate information processed by a debt management capability assessment server according to exemplary embodiments of the present invention. The information may be set by the manager computing device 11.

Referring to FIG. 4, the debt display option, that is, the display option information may be (i) a first display mode (normal mode) which provides a principal and an interest rate for each of the plurality of debts in a current round among rounds, (ii) a second display mode (retrospective mode) which provides an accumulated interest amount for each of the plurality of debts from the first round to the previous round of the current round, (iii) a third display mode (prospective mode) which provides an interest amount generated for each of the plurality of debts in a next round of the current round, or (iv) a combination (retroprospective mode) thereof. The interest information of the past, the present, and the future may serve as a hint for a user to make a decision.

Information about the round includes the number of rounds. Referring to FIG. 4, a maximum round may be set. The rounds are unidirectional and non-circulated. That is, the round proceeds from the current round to the next round, but does not proceed from the current round to the previous round. The user makes one decision for every round. The round in the scenario corresponds to one year in reality and helps to understand a tendency of the user indicating how the user repays the debt every year. Referring to FIGS. 4 and 5, the debt management assessment scenario includes at least one of profile information (not illustrated) of the user, bonus information, saving information, elapsed time, and initial asset information. The profile information of the user includes at least one of nationality, gender, age, an occupation, and a major.

The information about the plurality of debts includes identification information, a principal, and an interest rate for each of the debts. Among the plurality of debts, between at least two debts, at least one of the principal and the interest rate is different. A tendency of the user of making a decision to repay the plurality of debts having different principals and interests may be understood.

The information about the income includes cash information which is paid in every round. At least one of the interest rates and incomes of the plurality of debts may be set to vary in at least one of rounds. A difficulty of the scenario may vary due to the above-described setting. Various scenarios are configured so that it is possible to precisely grasp a decision making tendency of individuals or groups.

FIG. 6 illustrates a psychological event for every round, FIG. 7 illustrates a debt training strategy, FIG. 8 illustrates a quiz for debt management education, and FIG. 9 illustrates education contents in accordance with the assessment level.

Referring to FIG. 6, a personnel having a debt management optimizing tendency (financially optimal player: FOP) starts to repay a debt F having the highest interest rate and the largest amount. After finishing the repayment of F, the player starts to repay a debt E having a next highest interest rate. After finishing the repayment of E, the player starts to repay a debt C having a next highest interest rate.

In contrast, a personnel having a debt account avoidance tendency (debt account aversion: DAA) starts to repay a part of two debts A and B having a smallest amount. After finishing the repayment of B, the player starts to repay the debt C having a third smallest amount. After finishing the repayment of C, the player starts to repay the debt D having a next smallest amount. After finishing the repayment of D, the player starts to repay the debt E having a next smallest amount. After finishing the repayment of E, the player starts to repay the remaining last debt F.

During the round, an event where a psychological mechanism acts occurs. A scenario participant needs to determine first which debt needs to be paid in a first round. During the round, while the debt F having the highest interest rate and the largest amount is repaid, a balance of F may become smaller than the debt E having a second largest amount. Even though an account having a higher interest rate needs to be continuously repaid, the scenario participant focuses on a debt amount due to a psychological confusion to focus on an account having a higher debt amount regardless of the interest rate. During the round, a bonus is deposited. The scenario participant shows a tendency of depositing a part or all of the bonus.

According to the present exemplary embodiments, in order to correct a decision making mistake caused by the debtor's psychological confusion about multiple debts, a debt training strategy (DTS) illustrated in FIG. 7 is provided to (a computing device of) the scenario participant.

As illustrated in FIG. 7, the debt training strategy (DTS) may be configured by (i) a first strategy (DTS 1) of selecting a debt having a highest interest rate, (ii) a second strategy (DTS 2) of repaying a debt having the highest interest rate with all the cash, (iii) a third strategy (DTS 3) of repaying a debt having the highest interest rate even though the size of the debt is reduced, (iv) a fourth strategy (DTS 4) of repaying a debt having a higher interest rate with all cash even though the cash increases in accordance with a bonus income, or (v) a combination thereof.

An information processing unit generates education contents to learn the first strategy and the second strategy in the first round among the plurality of rounds. The information processing unit generates education contents to learn the third strategy in a round where a debt having the highest interest rate and the largest amount among the plurality of debts becomes smaller than a debt having a second highest interest rate and amount. The information processing unit generates education contents to learn the fourth strategy in a round where a bonus is deposited, among the plurality of rounds.

Referring to FIG. 8, when a round where a psychological event occurs or a final round ends, the information transmitting and receiving unit transmits a quiz about a plurality of debts to which different principals and interest rates for the plurality of debts set in the debt assessment scenario are applied, to the user computing device. When the information transmitting and receiving unit receives an answer of the user for the quiz, the information processing unit generates a feedback to which at least one of the first strategy, the second strategy, the third strategy, and the fourth strategy is applied in accordance with the answer of the user.

For example, it is understood that a user who selects an answer No. 2 of repaying a debt account B has a tendency of repaying the debt in the order of higher debt amount. When the quiz is also provided at a timing when the psychological event occurs, as the round proceeds, a confused psychological state of the user is objectively identified to provide a more specific feedback. The information processing unit provides a feedback for the first strategy among the debt training strategies to the user who selects No. 2. Thereafter, the debt management capability assessment server may provide a similar quiz in which the amount and the interest rate are changed or an additional quiz which requires another strategy.

It is understood that a user who selects an answer No. 4 or 5 of repaying the debt account D first knows the first strategy of paying the debt having the highest interest rate first, but does not know another strategy or selects a wrong answer due to the psychological confusion. The information processing unit may provide a feedback for the second strategy to the user who selects No. 4 or 5. Thereafter, the debt management capability assessment server may provide a similar quiz in which the amount and the interest rate are changed or an additional quiz which requires another strategy.

Whether a user who selects an answer No. 6 of repaying a debt account D first and then repaying a debt account B exactly knows a debt training strategy may be understood by tracking the choice of the debt by the user as each round proceeds. Alternatively, when the user accidentally selects a correct answer for the quiz, the debt management capability assessment server provides a similar quiz in which an amount and an interest rate are changed to prepare a standard for the user to repay the debt.

As illustrated in FIG. 9, the information processing unit selects a strategy among the first strategy, the second strategy, the third strategy, and the fourth strategy in accordance with the assessment level to generate education contents.

FIGS. 11 to 14 are views illustrating a screen of a user computing device according to another exemplary embodiment of the present invention. A debt management capability assessment method may be performed by a user computing device.

The user computing device participates in a debt management assessment scenario generated by a debt management capability assessment server. The user computing device receives information about the round, information about a plurality of debts, display option information about a plurality of debts to be displayed for every round, and information about the income from the debt management capability assessment server. Referring to FIG. 11, the user computing device provides information about the round, information about a plurality of debts, display option information about a plurality of debts to be displayed for every round, and information about the income.

The user computing device transmits (i) at least one debt selected from the plurality of debts, (ii) an amount of income to repay the selected at least one debt, and (iii) approval information which advances from the current round to a next round, for every round, to the debt management capability assessment server.

In FIG. 12, debt information of the current round is illustrated and in FIG. 13, debt information of the final round is illustrated. A maximum increased interest amount illustrated in FIG. 12 refers to a maximum interest amount which is generated in the next round when the debt is not repaid in the current round. This corresponds to a third display mode among the display options.

The user computing device receives education contents generated based on the debt training strategy in a round in which the psychological event occurs. The user computing device may receive a quiz for a debt management education together with the education contents in the round. When a predetermined assessment round ends, the user computing device receives a calculated assessment level from the debt management capability assessment server.

The debt management capability assessment method may further include a step of receiving a debt settlement amount for the plurality of debts together with the assessment level from the debt management capability assessment server, displaying an average debt settlement amount based on the debt settlement amount, and displaying the debt settlement amount on a graph according to the round. The graph and the user statistics illustrated in FIG. 4 may allow the user to easily grasp a debt repayment history and a decision making strategy on the scenario.

The debt management capability assessment method may receive feedback information defined in advance in accordance with the assessment level from the debt management capability assessment server. The debt management capability assessment method may receive the feedback information updated in association with questionnaire information regarding a mathematical knowledge and financial knowledge and the debt settlement amount input by the user.

FIGS. 15 and 16 are flow charts illustrating a debt management capability assessment method according to exemplary embodiments of the present invention. The debt management capability assessment method may be performed by the debt management capability assessment server or the computing device.

In step S1510, the manager computing device 11 transmits information about a round, a plurality of debts, a debt display option, and an income to the debt management capability assessment server 20. The debt management capability assessment server 20 receives information about the round, information about a plurality of debts, display option information about a plurality of debts to be displayed for every round, and information about the income from the manager computing device 11.

In step S1520, the debt management capability assessment server 20 generates a debt management assessment scenario based on the information about the round, the information about the plurality of debts, the display option information, and the information about the income. The information about the round includes the number of rounds and the rounds are unidirectional and non-circulated. The information about the plurality of debts includes identification information, a principal, and an interest rate for each of the debts. Among the plurality of debts, between at least two debts, at least one of the principal and the interest rate is different. The information about the income includes cash information which is paid in every round. At least one of the interest rates and incomes of the plurality of debts may be set to vary in at least one of rounds.

The display option information may be (i) a first display mode which provides a principal and an interest rate for each of the plurality of debts in a current round among rounds, (ii) a second display mode which provides an accumulated interest amount for each of the plurality of debts from the first round to the previous round of the current round, (iii) a third display mode which provides an interest amount generated for each of the plurality of debts in a next round of the current round, or (iv) a combination thereof.

The debt management assessment scenario includes at least one of profile information of the user, initial asset information, bonus information, saving information, and elapsed time. The profile information of the user includes at least one of nationality, gender, age, an occupation, and a major.

In step S1530, the debt management capability assessment server 20 calculates an assessment standard amount for a total amount of the plurality of debts from a first round to a predetermined assessment round for the debt management assessment scenario, based on the information about the round and the information about the plurality of debts. The predetermined assessment round may correspond to the final round among the rounds. The assessment standard amount is an amount obtained by minimizing a total amount for the plurality of debts mathematically calculated by reflecting an interest rate corresponding to a principal amount of each of the plurality of debts as the round progresses.

In step S1540 or S1610, the debt management capability assessment server 20 transmits the information about the round, the information about the plurality of debts, the display option information, and the information about the income to the computing devices 31 and 32 of at least one user among the plurality of uses who participates in the debt management assessment scenario.

In step S1560 or S1620, the debt management capability assessment server 20 transmits the education contents to the computing devices 31 and 32 of at least one user among the plurality of uses who participates in the debt management assessment scenario. The debt management capability assessment server 20 generates and transmits education contents based on the debt training strategy in a round where a psychological event occurs, among the plurality of rounds.

In step S1560 or S1620, the debt management capability assessment server 20 may further include a step of transmitting a quiz about the plurality of debts with different principals and interest rates set in the debt management scenario to the user computing device. The debt management capability assessment server 20 may receive the answer of the user for the quiz and provide a feedback to which a first strategy, a second strategy, a third strategy, a fourth strategy, or a combination thereof is applied in accordance with the answer of the user for the quiz.

The debt training strategy may be configured by (i) a first strategy of selecting a debt having a highest interest rate, (ii) a second strategy of repaying a debt having the highest interest rate with all the cash, (iii) a third strategy of repaying a debt having the highest interest rate even though the size of the debt is reduced, (iv) a fourth strategy of repaying a debt having a higher interest rate with all cash even though the cash increases in accordance with a bonus income, or (v) a combination thereof.

In step S1560 or S1620, the debt management capability assessment server 20 provides the first strategy and the second strategy in a first round among the plurality of rounds. The debt management capability assessment server 20 provides the third strategy in a round in which a debt having the highest interest rate and amount among the plurality of debts is smaller than a debt having the second highest interest rate and amount. The debt management capability assessment server 20 provides the fourth strategy in a round in which a bonus is deposited, among the plurality of rounds.

In step S1550 or S1630, the debt management capability assessment server 20 receives (i) at least one debt selected from the plurality of debts, amount of income to repay the selected at least one debt, and (iii) approval information which advances from the current round to a next round, for every round, from the at least one user computing device 31.

In step S1570 or S1640, when the predetermined assessment round ends, the debt management capability assessment server 20 calculates a debt settlement amount based on (i) at least one debt selected from the plurality of debts and (ii) an amount to repay the selected at least one debt which have been received until the assessment round.

In step S1570 or S1640, the debt management capability assessment server 20 rates an assessment level on at least one user based on a difference between the debt settlement amount and an assessment standard amount.

In step S1580 or S1650, the debt management capability assessment server 20 transmits the assessment level to the at least one user computing device 31 or 32.

The debt management capability assessment method may further include a step of transmitting feedback information defined in advance in accordance with the assessment level to at least one user computing device. The debt management capability assessment server 20 selectively provides a strategy among the first strategy, the second strategy, the third strategy, and the fourth strategy in accordance with the assessment level.

The debt management capability assessment method may update the feedback information in association with questionnaire information regarding a mathematical knowledge and financial knowledge and the debt settlement amount received from at least one user computing device before or after the step of generating a debt management assessment scenario. The questionnaire information may include information about an actual asset, an actual debt, and an actual income of at least one user.

The debt management capability assessment method may further include a step of calculating a weight and a repayment strategy for the actual debt based on the information about an actual asset, an actual debt, and an actual income of the user to update the feedback information and transmitting the updated feedback information to the user computing device.

The debt management capability assessment method may further include a step S1670 of generating and updating a debt ability assessment model. The debt ability assessment model is generated by receiving (i) at least one debt selected from the plurality of debts, (ii) an amount of income to repay the selected at least one debt, and (iii) approval information which advances from the current round to a next round, which are received for every round, from the plurality of user computing devices 31 and statistically analyzing them together with profile information of the plurality of users. The debt management capability assessment method may further include a step of scoring the debt management capability of the plurality of users using the debt ability assessment model.

In step S1680 or S1690, the debt management capability assessment server 20 transmits the debt management capability score to the at least one user computing device 31 or 32.

In FIGS. 15 and 16, the respective processes are sequentially performed, but this is merely illustrative and those skilled in the art may apply various modifications and changes by changing the order illustrated in FIGS. 15 and 16 or performing one or more processes in parallel or adding another process without departing from the essential gist of the exemplary embodiment of the present disclosure.

Referring to FIG. 17, it is easily understood that a group which is provided with the debt management education contents and the feedback information makes the same or similar decision as the debtor (FOP) with a tendency to optimize debt management.

The operation according to the exemplary embodiment of the present disclosure may be implemented as a program instruction which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

The invention claimed is:

1. A debt management capability assessment education method by a debt management capability assessment server including a communication modem, a processor and a non-transitory computer-readable medium storing instructions that cause the server to operate the method when the instructions are executed by the processor, the method comprising:

receiving, from a user computing device, information about a plurality of rounds, information about a plurality of debts, information about a display mode set by the user computing device, display option information about the plurality of debts to be displayed for each round of the plurality of rounds and information about an income, wherein the display option information is displayed by the user computing device and includes information of (i) a normal display mode which provides a principal and an interest rate of each of the plurality of debts in a present round among the plurality of rounds, (ii) a retrospective display mode which provides an accumulated interest amount for each of the plurality of debts from a round among the plurality of rounds to a previous round among the plurality of rounds, (iii) a prospective display mode which provides an interest amount generated for each of the plurality of debts in a next round among the plurality of rounds and (iv) a combined display mode which is a combination of the retrospective display mode and the prospective display mode, and wherein the display mode is set by the user computing device among the normal display mode, the retrospective display mode, the prospective display mode and the combined display mode;

generating a debt assessment scenario based on the information about the plurality of rounds, the information about the plurality of debts, the information about the display mode set by the user computing device, the display option information about the plurality of debts to be displayed for each round of the plurality of rounds and the information about the income;

receiving debt repayment information for every round from the user computing device, wherein a user of the user computing device participates in the debt assessment scenario;

selecting a debt training strategy in a round among the plurality of rounds;

transmitting education contents to the user computing device based on the selected debt training strategy in the round among the plurality of rounds;

calculating a debt settlement amount for the plurality of debts based on the debt repayment information received from the user computing device until a predetermined assessment round when the predetermined assessment round among the plurality of rounds ends, rating an assessment level for the user based on the debt settlement amount, and transmitting the assessment level to the user computing device;

receiving questionnaire information from the user computing device, the questionnaire information including an actual asset, an actual debt and an actual income of the user;

based on the received questionnaire information, updating feedback information predefined in accordance with the assessment level; and transmitting the updated feedback information to the user computing device, wherein the method further comprises:
generating a debt ability assessment model by receiving information including (i) at least one debt selected from a plurality of debts, (ii) an amount of income to repay the selected at least one debt, and (iii) approval information which advances from a current round to a next round which are received for every round of the plurality of rounds from a plurality of user computing devices including the user computing device and by statistically analyzing the received information together with profile information of a plurality of users of the plurality of user computing devices,
training the debt ability assessment model based on an event occurring in the middle of the debt assessment scenario, a debt repayment order, a difference between interest rates, a difference between debt amounts, and a debt display option; and
scoring a debt management capability of each of the plurality of users using the debt ability assessment model and transmitting a debt management capability score of the user to the user computing device,
wherein the debt training strategy is selected from among (i) a first strategy of selecting a debt having a highest interest rate, (ii) a second strategy of repaying a debt having the highest interest rate with all cash, (iii) a third strategy of repaying a debt having the highest interest rate even though a size of the debt is reduced, (iv) a fourth strategy of repaying a debt having a higher interest rate with all cash even though the cash increases in accordance with a bonus income, or (v) a combination thereof,
wherein in the transmitting of the education contents to the user computing device, the first strategy and the second strategy are provided in a first round among the plurality of rounds,
wherein in the transmitting of the education contents to the user computing device, the third strategy is provided in a round in which a debt having the highest interest rate and amount among the plurality of debts is smaller than a debt having a second highest interest rate and amount,
wherein in the transmitting of the education contents to the user computing device, the fourth strategy is provided in a round in which a bonus is deposited, among the plurality of rounds, and
wherein the transmitting the education contents to the user computing device based on the debt training strategy comprises:
based on the received debt repayment information, determining whether the user of the user computing device repays a debt among a plurality of debts according to a debt account avoidance tendency due to a psychological event in the round among the plurality of rounds, wherein the debt account avoidance tendency indicates a repayment order of the plurality of debts in which a debt having a smallest amount among the plurality of debts is first repaid, and the debt account avoidance tendency is different from a debt management optimizing tendency indicating a predetermined repayment order of the plurality of debts in which a debt having the highest interest rate among the plurality of debts is first repaid, and
transmitting the education contents to the user computing device when it is determined that the user of the user computing device repays the debt among the plurality of debts according to the debt account avoidance tendency due to the psychological event in the round among the plurality of debts,
wherein the method further comprises:
transmitting a content about the plurality of debts with different principals and interest rates set in the debt assessment scenario to the user computing device after ending of the round where the psychological event occurs,
receiving a response to the content from the user computing device, and
transmitting, to the user computing device, a feedback to which the first strategy, the second strategy, the third strategy, the fourth strategy or a combination thereof is applied based on the response received from the user computing device.

2. The debt management capability assessment education method according to claim 1, wherein the information about the plurality of rounds includes the number of rounds and the rounds are unidirectional and non-circulated, the information about the plurality of debts includes identification information, a principal, and an interest rate for each of the plurality of debts, and among the plurality of debts, between at least two debts, at least one of the principal and the interest rate is different, and the debt repayment information includes (i) at least one debt selected from the plurality of debts and (ii) an amount to repay the at least one debt selected.

3. The debt management capability assessment education method according to claim 2, wherein in the generating of the debt assessment scenario, the information about the plurality of debts and the information about the income input in accordance with a personal financial situation by the user is used to generate a personally customized debt assessment scenario, and the information about the plurality of rounds is set in months or years.

4. The debt management capability assessment education method according to claim 1, wherein in the transmitting of the assessment level to the user computing device, a strategy is selected from the first strategy, the second strategy, the third strategy, and the fourth strategy in accordance with the assessment level to be provided.

5. The debt management capability assessment education method according to claim 1, wherein in the generating of the debt assessment scenario, an assessment standard amount for a total amount of the plurality of debts from the first round to a predetermined assessment round for the debt assessment scenario is calculated based on the information about the plurality of rounds and the information about the plurality of debts, and the assessment standard amount is an amount obtained by minimizing a total amount for the plurality of debts mathematically calculated by reflecting an interest rate corresponding to a principal amount of each of the plurality of debts as the round progresses.

6. A debt management capability assessment server, the server comprising:
a communication modem;
a processor; and
a non-transitory computer-readable medium storing instructions executable by the processor,
wherein the processor is configured to:
control the communication modem to receive, from a user computing device, information about a plurality of rounds, information about a plurality of debts, information about a display mode set by the user computing device, display option information about the plurality of debts to be displayed for each round of the plurality of rounds and information about an income, wherein the display option information is displayed by the user computing device and includes information of (i) a normal display mode which provides a principal and an interest rate of each of the plurality of debts in a present round among the plurality of rounds, (ii) a retrospective display mode which provides an accumulated interest amount for each of the plurality of debts from a round among the plurality of rounds to a previous round among the plurality of rounds, (iii) a prospective display mode which provides an interest amount generated for each of the plurality of debts in a next round among the plurality of rounds and (iv) a combined display mode which is a combination of the retrospective display mode and the prospective display mode, and wherein the display mode is set by the user computing device among the normal display mode, the retrospective display mode, the prospective display mode and the combined display mode, generate a debt assessment scenario based on the information about the plurality of rounds, the information about the plurality of debts, the information about the display mode set by the user computing device, the display option information about the plurality of debts to be displayed for each round of the plurality of rounds and the information about the income;

control the communication modem to receive debt repayment information for every round from the user computing device, wherein a user of the user computing device participates in the debt assessment scenario; and select a debt training strategy in a round among the plurality of rounds;

generate education contents based on the selected debt training strategy in the round among the plurality of rounds, wherein the processor is configured to calculate a debt settlement amount for the plurality of debts based on the debt repayment information received from the user computing device until a predetermined assessment round when the predetermined assessment round among the plurality of rounds ends, and rate an assessment level for the user based on the debt settlement amount, and control the communication modem to transmit the education contents to the user computing device in the round in which the psychological event occurs and when the assessment round ends, and transmit the assessment level to the user computing device, wherein the processor is further configured to:

control the communication modem to receive questionnaire information from the user computing device, the questionnaire information including an actual asset, an actual debt and an actual income of the user, based on the received questionnaire information, update feedback information predefined in accordance with the assessment level, and control the communication modem to transmit the updated feedback information to the user computing device, wherein the processor is further configured to:

generate a debt ability assessment model by receiving information including (i) at least one debt selected from a plurality of debts, (ii) an amount of income to repay the selected at least one debt, and (iii) approval information which advances from a current round to a next round which are received for every round of the plurality of rounds from a plurality of user computing devices including the user computing device and by statistically analyzing the received information together with profile information of a plurality of users of the plurality of user computing devices, train the debt ability assessment model based on an event occurring in the middle of the debt assessment scenario, a debt repayment order, a difference between interest rates, a difference between debt amounts, and a debt display option, and score a debt management capability of each of the plurality of users using the debt ability assessment model and control the communication modem to transmit a debt management capability score of the user to the user computing device, wherein the debt training strategy is selected from among (i) a first strategy of selecting a debt having a highest interest rate, (ii) a second strategy of repaying a debt having the highest interest rate with all cash, (iii) a third strategy of repaying a debt having the highest interest rate even though a size of the debt is reduced, (iv) a fourth strategy of repaying a debt having a higher interest rate with all cash even though the cash increases in accordance with a bonus income, or (v) a combination thereof, wherein the processor is configured to generate education contents to learn the first strategy and the second strategy in the first round among the plurality of rounds, generate education contents to learn the third strategy in a round where a debt having the highest interest rate and the largest amount among the plurality of debts becomes smaller than a debt having a second highest interest rate and amount, and generate education contents to learn the fourth strategy in a round where a bonus is deposited, among the plurality of rounds, and wherein the processor is further configured to:

based on the received debt repayment information, determine whether the user of the user computing device repays a debt among a plurality of debts according to a debt account avoidance tendency due to a psychological event in the round among the plurality of rounds, wherein the debt account avoidance tendency indicates a repayment order of the plurality of debts in which a debt having a smallest amount among the plurality of debts is first repaid, and the debt account avoidance tendency is different from a debt management optimizing tendency indicating a predetermined repayment order of plurality of debts in which a debt having the highest interest rate among the plurality of debts is first repaid, and control the communication modem to transmit the education contents to the user computing device when it is determined that the user of the user computing device repays the debt among the plurality of debts according to the debt account avoidance tendency due to the psychological event in the round among the plurality of debts, wherein the processor is further configured to:

control the communication modem to transmit a content about the plurality of debts with different principals and interest rates set in the debt assessment scenario to the user computing device after ending of the round where the psychological event occurs, control the communication modem to receive a response to the content from the user computing device, and control the communication modem to transmit, to the user computing device, a feedback to which the first strategy, the second strategy, the third strategy, the fourth strategy or a combination thereof is applied based on the response received from the user computing device.

7. The debt management capability assessment server according to claim 6, wherein the processor is configured to select a strategy from the first strategy, the second strategy, the third strategy, and the fourth strategy in accordance with the assessment level to generate the education contents.

* * * * *